United States Patent [19]
Singleton

[11] 4,137,073
[45] Jan. 30, 1979

[54] METHOD AND APPARATUS FOR TREATING ALUMINOUS METAL SKIM MATERIAL AND BY-PRODUCTS OF SAID METHOD

[75] Inventor: Ogle R. Singleton, Richmond, Va.

[73] Assignee: Reynolds Metals Company, Richmond, Va.

[21] Appl. No.: 771,666

[22] Filed: Feb. 24, 1977

Related U.S. Application Data

[63] Continuation-in-part of Ser. No. 642,028, Dec. 18, 1975, abandoned.

[51] Int. Cl.² ................................. C22B 21/00
[52] U.S. Cl. ....................... 75/68 R; 75/24; 106/87; 266/204
[58] Field of Search ............... 75/68 R, 24; 266/204; 106/87

[56] References Cited

U.S. PATENT DOCUMENTS

| | | | |
|---|---|---|---|
| 3,374,089 | 3/1968 | Robinson, Jr. et al. | 75/68 R |
| 3,999,980 | 12/1976 | Montaga | 75/68 R |

*Primary Examiner*—M. J. Andrews
*Attorney, Agent, or Firm*—Glenn, Lyne, Girard, Clark and McDonald

[57] ABSTRACT

A method for treating hot skim material to separate, recover, and prepare for use both aluminum and non-aluminous constituents contained in the hot skim materials involves a centrifuge having a rotatable bowl to receive a charge of skim material. The centrifuge then both consolidates the non-aluminous constituents thereof into a semi-porous cake and separates and discharges molten aluminum as the bowl is rotated. The semi-porous cake is cooled and found to be friable. Thereafter, the friable cake is crushed and screened to be used as a foaming and extending agent.

13 Claims, 10 Drawing Figures

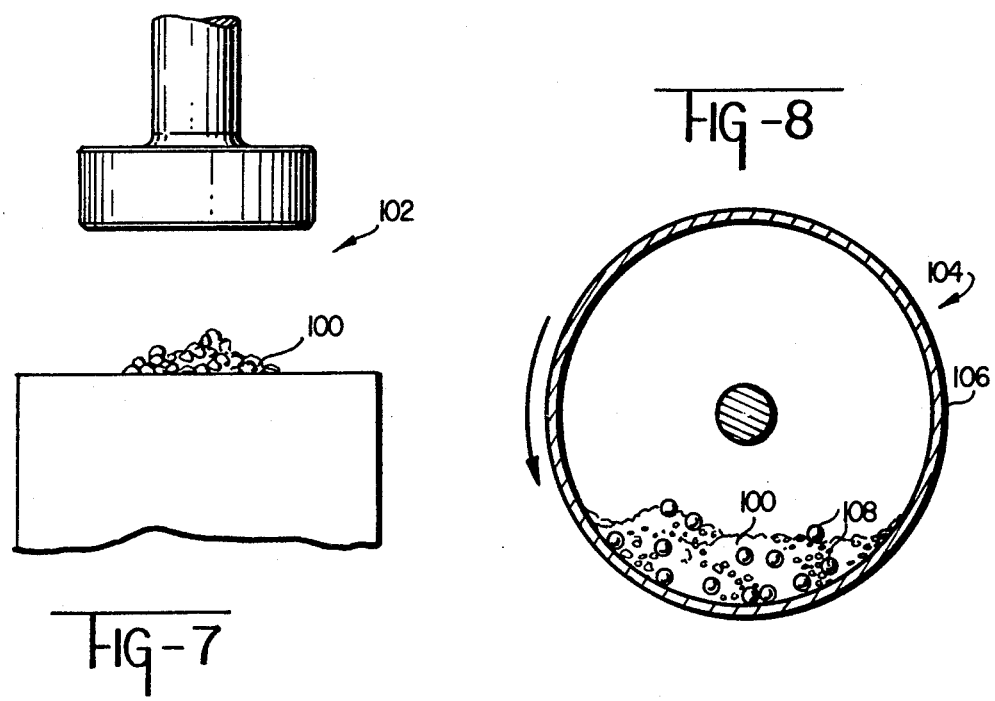
FIG-8
FIG-7
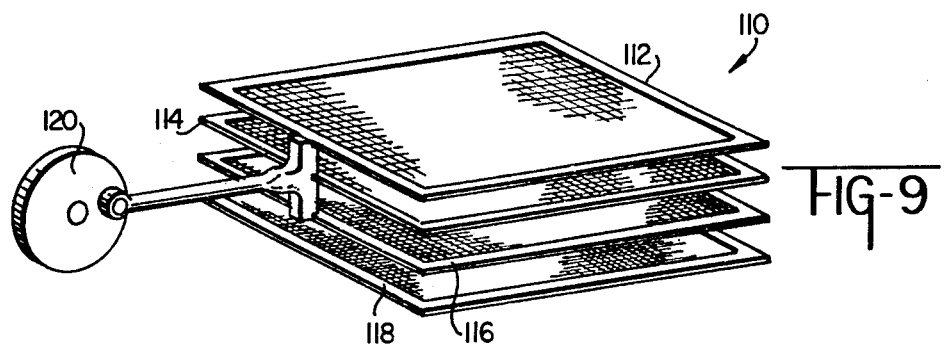
FIG-9
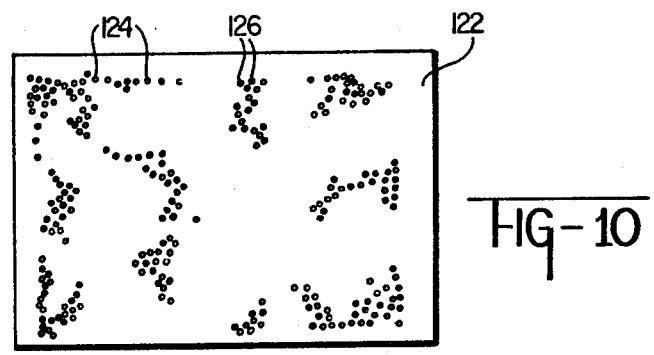
FIG-10

METHOD AND APPARATUS FOR TREATING ALUMINOUS METAL SKIM MATERIAL AND BY-PRODUCTS OF SAID METHOD

This is a continuation-in-part of application Ser. No. 642,028 filed Dec. 18, 1975, now abandoned.

This invention relates to the art of recovering aluminum from skim material, and it particularly concerns the treatment of hot skim material in a manner which allows recovery and use of non-aluminous constituents of skim material as a new by-product.

As used herein, aluminum (or aluminous metal) includes the metal itself and alloys containing aluminum as the principal element by weight. The aluminum product obtained in accordance with the invention may contain incidental amounts of skim residue, usually amounting to less than 5% by weight. The term skim material refers to a kind of dross or skim commonly formed on a body of molten aluminum. It is a viscous, mushy or powdery substance of variable composition which floats on molten aluminum, and may include oxides, nitrides and other non-metallic compounds. Removal of such dross by skimming carries with it a considerable quantity of aluminum, and the skim material often is subjected to some type of treatment to recover at least part of its aluminum values.

Melting furnace skim material can amount to as much as 1.5 to 4% of the furnace charge, and its aluminum content generally ranges from about 55 to 80% of the weight of the skim material. Thus, the efficient recovery of aluminum alone from skim material can have economic implications of appreciable significance. In the past, the residual non-aluminous portion of the skim material has normally been discarded and has served as a source of pollution.

BACKGROUND OF THE INVENTION

Conventional methods of skim processing involve physical removal of the skim from the melt surface by mechanical means, followed by secondary treatment to reclaim as much of the aluminous metal content as possible.

The handling of the skim in the metal melting or holding furnace has a direct influence on the extent of subsequent recovery of aluminous metal from the skim. When a sufficient layer of skim has accumulated on the melt, it should be removed promptly, not only so that heating may continue efficiently, but more importantly, to minimize or prevent oxidation of the entrained metal.

Skim formation on a melt surface apparently commences as a result of oxide in the original charge floating to the surface with adhering metal. In this original state relatively little oxidation has taken plane, and the layer on the melt may contain as much as 95 percent metal. If heat is supplied through this layer, the layer acts as a barrier to heat transfer and its temperature increases. Oxidation begins to increase and changes in physical form can be noted. Oxidation is promoted by the presence of air or products of combustion in an open hearth furnace. Hot molten aluminum skim will combine preferentially with oxygen to form oxides, but reactions can proceed with nitrogen to form nitrides and with carbon dioxide to form oxides and carbides.

As heating proceeds, the original wet mushy skim can change to a powdery form, in which the aluminum appears to form droplets with powdered non-metallic materials on the surface. This latter physical form has a higher oxidation rate than the wet mushy form. As these reactions are highly exothermic and increase with temperature and mass of the layer, they can quickly get out of control and a reaction known as thermiting takes place. Thermiting results in a rapid loss of metal through oxidation and it is difficult to control.

Skim can also be generated as the result of metal transfer operations. Such skim is generally of the wet mushy type but it behaves similarly to skim originating from melting. Skim can also be generated from fluxing with gases such as chlorine, chlorine-nitrogen or other gases used for metal cleanliness purposes. These operations themselves may ignite the skim giving further oxidation.

In prior-art aluminum melting it has been an object to generate the least amount of non-metallic material and separate as much metal as possible in the unoxidized state from the skim itself without regard for recovering the nonaluminuus constituents of the skim.

In the past, for example, thermiting has been employed intentionally to separate aluminum metal from skim. While thermiting occurs as the result of igniting molten aluminum and using it as a fuel, such burning can be used to separate molten aluminum from a mass of skim, particularly when combined with some form of agitation. Thermiting may be induced by the use of a solid ignition salt flux. Mixtures such as 75 percent sodium chloride-25 percent cryolite, anhydrous aluminum chloride, or proprietary compositions containing an active fluouride are generally employed. Gaseous chlorine may be introduced into the melt below the skim layer in conjunction with such treatment. However, the introduction of such chemicals contaminates the non-aluminous constituents of the skim thereby inhibiting their recovery and use as well as making it difficult to dispose of them because they serve as a source of pollution.

It has been proposed, in one prior-art approach, to handle the skim so as to induce and maintain thermiting or burning under controlled conditions by working the skim in an inclined rotary barrel open to the atmosphere, under oxidizing conditions, thus permitting a certain proportion of the metal content to be consumed, in order to recover the rest. This method has the drawbacks of being technically complicated to operate, and of causing voluminous fumes during tumbling of the thermiting skim.

In a subsequent development, the method was modified by covering the rotary barrel and introducing gaseous chlorine to provide an inert aluminum chloride vapor atmosphere. However, with this method, when the cover is removed, a thermiting residue is exposed to the air, creating fume control and safety problems even more acute than those encountered using an open barrel.

A more recent development has been the rotary salt flux furnace process, which is believed to be presently in use, and which involves placing the aluminous skim or dross inside a rotary barrel furnace, and then adding a predetermined amount of a salt flux in solid form. The furnace is then rotated at a suitable rate of speed to obtain a tumbling or cascading action of the mixture of dross and solid flux to break up large lumps of dross. Heat is then applied to the mixture by means of an oil or gas burner effective to liquefy the flux. After the flux is liquefied, the mixture is subjected to a gentle rolling action at a lower speed of rotation, during which the recoverable molten metal is separated from the dross. The flux is preferably a eutectic mixture of about 55 percent potassium chloride and 45 percent sodium chloride, to which from 2.5 percent to 5 percent of cryolite or other fluoride may be added to promote oxide removal from the metal particles. This method has the disadvantages of applying the burner flame directly to the flux, thus presenting a possible source of air pollution, and also requiring a rather high proportion of flux, amounting to about 50 percent or more by weight of the skim. Also, importantly, the residue is contaminated with flux which can be a major detriment to further recovery, processing or disposal thereof. The installation of the rotary furnace also represents a considerable capital investment.

More recently still, the method of molten flux salt stirring in reclaiming aluminous metal from skim or dross has been provided which helps to avoid many of the disadvantages of flux treatment. Skim removed from a body of molten aluminum is placed in a preheated pot, covered with a molten salt flux and subjected to stirring action. This technique permits the use of much less salt flux, minimizes the emission of fumes from the pot, and improves the recovery of aluminum. However, it has certain disadvantages in common with any flux treatment, as related to contamination of the non-aluminous residue, and usually involves the hot dumping of residue at temperatures high enough to be hazardous and to cause objectionable fuming.

Accordingly, what the art has sought, and by various means has attempted to find, is an effecient method of recovering aluminuous metal from skim material with the least possible cost and difficulty of operation. It is an object of this invention to provide a process for treating molten aluminum hot skim material to not only recover an acceptable amount of aluminum therefrom but to also recover relatively uncontaminated non-aluminous constituents therefrom.

It is a further object of this invention to provide a method for treating non-aluminous constituents of hot skim for subsequent use thereof.

It is also an object of this invention to provide new by-products from a process of treating skim material.

GENERAL DESCRIPTION OF THE INVENTION

As noted above, various techniques have been used for treating aluminous metal skim material, many of which involve a molten salt flux. An object of the present invention is to accomplish the separation and recovery of aluminum from skim material without the use of flux, and, as far as possible, without resort to a thermiting reaction by which much of its aluminum content is combusted to provide heat.

It has been found, in accordance with the invention, that hot skim material as removed from a melting furnace, for example, is susceptible to treatment mechanically in a suitable centrifuge device to extract a large, and acceptable, proportion of its metallic aluminum content, leaving an uncontaminated ash-like residue containing carbides, nitrides, and some aluminum. This residue is relatively dry and friable, and can be crushed, milled and screened to form useful by-products.

The centrifuging is conveniently accomplished using a container-like centrifuge bowl of special design, particularly with regard to its having a peripheral outlet orifice for discharging the molten aluminum which is separated from residual portions of the skim material that remain in the bowl after centrifuging. This type of centrifuge construction has been found superior for treating skim material, because the skim residue will consolidate, or bridge across the gap created by a relatively narrow peripheral outlet without interfering appreciably with the outlet flow of molten aluminum. In this respect, the skim residue consolidates into a semi-porous cake which, to some extent, filters aluminum passing through the narrow peripheral outlet. In contrast, using a large number of small outlet holes peripherally of the centrifuge tends to result in plugging the holes, making the removal of skim residue more difficult.

The outlet orifice may be continuous peripherally, or divided into a few segments as desired for purposes of providing adequate support between separate wall and closure components of the centrifuge bowl. The peripheral gap should be at least ⅛ inch and up to about 1 inch, but usually a gap on the order of 3/16 to ¼ inch will suffice. Suitable speeds of rotation are relatively slow, being typically at least about 150 rpm, and preferably bout 200 to 300 rpm, for equipment about 3 feet in diameter, when processing skim material at 1400° F., and correspondingly faster or slower for other bowl diameters to achieve similar centrifugal effects.

It has been found conveninet to place a charge of skim material in the bowl and then operate the centrifuge to rotate the bowl and its charge gradually to operating speed. This may take as much as a minute or two after which spinning at the selected operating speed continues for about 5 to 10 minutes. Starting slowly helps to distribute the charge more uniformly, and the subsequent higher speed assures continued separation of molten aluminum after the easier-to-remove portions have been discharged at lower speed. If desired, part of the molten aluminum contents of the charge can even be poured from the bowl before the balance is centrifuged to achieve further separation.

It is sometimes desirable to preheat the bowl, if it is not hot enough already from recent previous use, to avoid premature solidification of aluminum and achieve satisfactory recovery. A recovery of 40 to 75% (pref. at least 65%) of the available aluminum content of the skim material is usually sufficient, because getting out all or even greater amounts cannot be accomplished easily enough to warrant the effort, and leaving a certain minimum amount of aluminum in the residue increases its commercial value as a saleable by-product.

In the centrifuge method of the present invention, skim material is pulled from a melting furnace as in other methods of treatment, but preferably as soon as the furnace charge has completely melted. This conserves energy in the furnace, since the skim or dross acts as an insulating blanket which interferes with heat transfer from burners of the furnace to the melt, and the condition then pertaining usually corresponds to the highest overall temperature the skim will reach with a minimum of oxidation.

The hot skim material is charged into the container bowl of a suitable centrifuge unit (or into a separate removable bowl in the case of remote operation of the centrifuge), and covered. If desired an inert gas may be injected into the bowl. The centrifuge unit with such bowl and its charge in place is operated at a speed sufficient to separate molten aluminum from residual portions of the charge. The separated aluminum is conveniently expelled from the centrifuge bowl during spinning and collected in a reservoir trough or drained into suitable molds. The residue is retained in the bowl and preferably cooled at least below 1000° F. to reduce the chances of thermiting. During the cooling process the bowl preferably is or remains covered, and may be flooded with an inert gas if desired. Of course, the used bowl containing hot residue material may be removable from the centrifuge so that the unit can be operated again with another bowl.

The skim material is preferably centrifuged at a temperature between 1350° F. and 1500° F. Below 1350° F., and above the liquidus of the alloy involved, the conservation of heat needed to keep the metallic phase liquid and easily extractable is more difficult to achieve. Below the liquidus (but above the solidus) yield is markedly reduced. The process is operable above 1500° F., but usually with considerable metal loss due to spontaneous thermiting unless the skim material is kept under inert gas.

The centrifuged residue, after cooling below about 1,000° F., is fairly coherent, or caked, however, the residue is preferably cooled to below about 350° F. for safety and ease of unloading from the bowl with the generation of a minimum of dust. By way of example, a skim material originally containing 70% aluminum by weight, was treated to recover about 70% of its available aluminum content (or 49 pounds per 100 lbs. of skim material). The residue has a metallic aluminum content of approximately 40%, the balance being metallic oxides, carbides, nitrides and the like.

The residue from the centrifuge is suitable for conventional reclamation treatment. It can be readily crushed and screened into fractions of different metallic content. For example, a +4 mesh (Tyler Seive Series) fraction may have a metallic content of about 50%, and can be puddle melted or remelted with a minimum amount of flux to form a recovered melt. A −4 +28 mesh fraction may be processed as in the prior-art to separate aluminum therefrom. A −28 +100 mesh fraction may be recrushed and screened. And a −100 mesh fraction may be used as a foaming/extending agent in cements, or plastic materials, thus utilizing its carbide and nitride content, as well as the metallic fraction, for gas generation.

With regard to various features of construction of the centrifuge apparatus, as provided in accordance with the invention, it has been found desirable to use a centrifuge having bowl-like container means adapted to receive a charge of the skim material, with a narrow peripheral outlet orifice for discharging molten aluminum as it is separated from residual portions of the charge. This can be accomplished in various ways. Thus, the bowl may have a separate base or bottom closure and a cooperating removable sleeve forming an outer wall of the bowl. An outlet gap is provided peripherally of the bowl, for example, either by mounting such a sleeve in spaced relation to the base, or by allowing freedom of movement of the sleeve away from the base when they are rotated, with adjustable stop means to limit the extent of such movement. In the latter arrangement, the sleeve may be frusto-conically shaped to taper outwardly toward the base (i.e. inwardly toward the top) to cause a lifting action of the charge against the sleeve during rotation at operating speed. Or the bowl may have an integral side wall and bottom, with an upper partial closure member at the top, leaving a peripheral outlet gap adjacent the wall. In that case the bowl wall may be tapered outwardly toward the top.

The bowl components are preferably lined with an insulating refractory and may be further heat insulated, if desired, as by mounting the bowl for rotation within a stationary enclosure or outer casing. The bowl is rotated by suitable drive means, such as an air motor or an electric motor, which may include a variable speed control, and the bowl is preferably removable from the centrifuge unit such as by being supported for rotation on a motor-driven turntable. Positive drive is achieved by temporarily interconnecting the bowl and turntable mechanically as by means of centering studs or releasable pin connections.

Where the centrifuge bowl includes separate sleeve and base members arranged to be spaced apart during rotation to form a peripheral outlet gap therebetween, it has been found convenient to provide for controlling the size of this gap, such as by providing radial extensions of the base member and corresponding lateral tabs on the sleeve, with upwardly extending studs affixed to such extensions and associated stop means adjustably placed along the studs to contact the corresponding tabs and either set or limit the relative spacing between such sleeve and base members of the bowl.

The crushing and screening apparatus are described in detail below.

These and other details of contruction are illustrated in, and will be described further in connection with, the accompanying drawings of presently preferred embodiments, in which:

FIG. 1 shows a skim centrifuge unit, largely in vertical cross-section, including a centrifuge container of the type comprising a refractory lined base component mounted on a motor driven turntable and a separate refractory lined sleeve member forming an outer wall of the container, with a stationary collector trough arranged to receive material discharged from the container through a peripheral outlet gap between the base and sleeve portions thereof;

FIG. 7 is a schematic representation of a hammer mill used to crush residual skim material;

FIG. 8 is a cross-sectional, partially schematic, view of a ball mill that is used to further crush residual skim material in practicing this invention;

Figure 1:
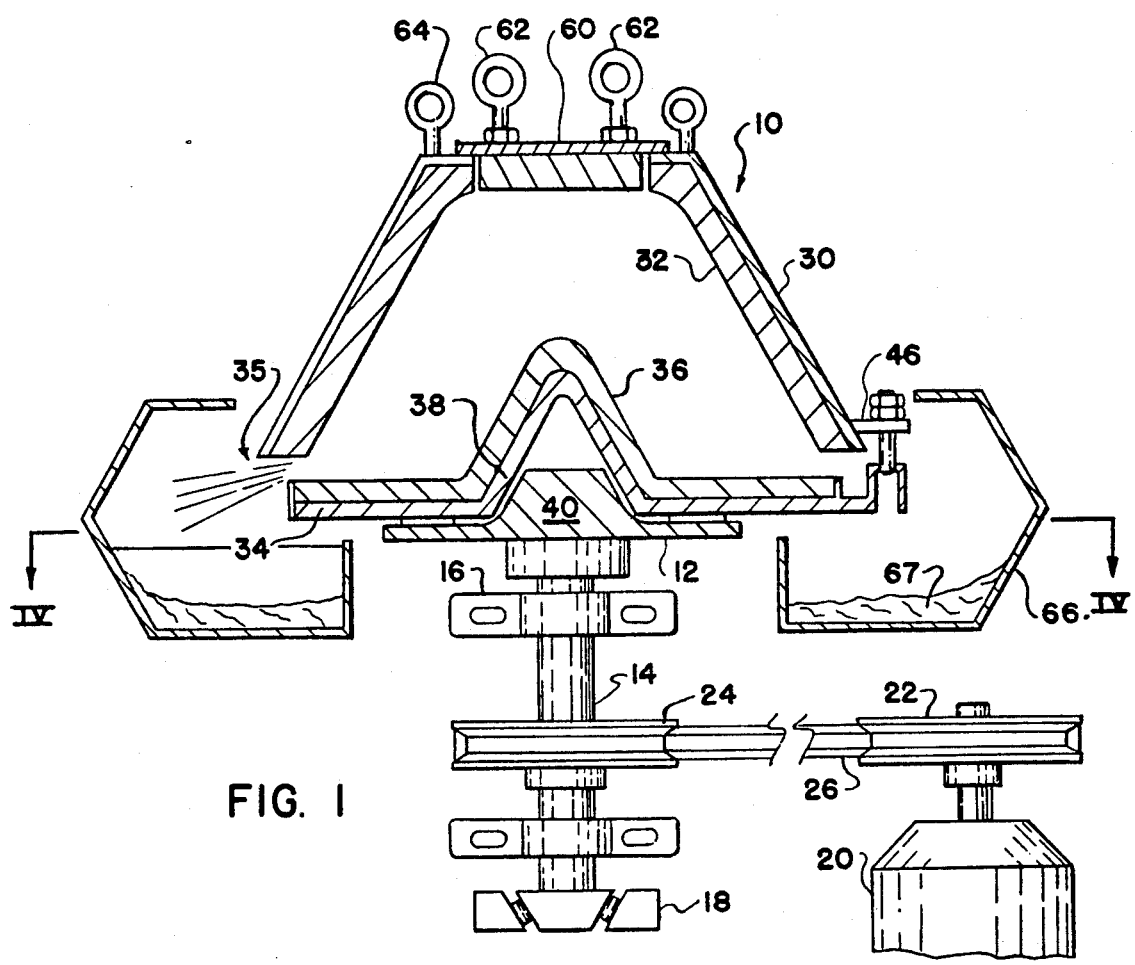
Figure 2:
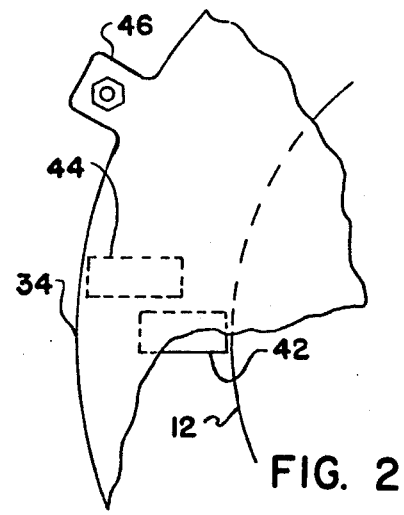
FIG. 2 is a fragmentary plan view showing an arrangement for transmitting rotary motion of the turntable to the base component of the centrifuge container of FIG. 1.

FIG. 9 is an isometric view, partially schematic, partially magnified as to screen openings, of a screening assembly as is used for sorting crushed residual skim material in practicing this invention; and, FIG. 10 is a magnified cross-sectional view of a piece of cement fabricated with a foaming/extending agent of this invention With reference to FIG. 1, it may be seen that the centrifuge unit 10 includes a motor driven turntable 12, having a drive shaft 14 with upper and lower support bearings 16 and 18, and having a motor 20, motor pulley 22, shaft pulley 24 and interconnecting V-belt 26. Mounted for rotation with the turntable 12 is a centrifuge container having an outer peripheral sleeve or wall 30 with an interior refractory lining 32, and a cooperating base plate 34 having an interior refractory lining 36. The base plate includes a hollow tapered central enlargement or socket 38 cooperating with a corresponding frustoconical hub 40 on the turntable 12 to center the base plate on the turntable. Rotation of the turntable 12 is transmitted to the base plate 34 by means of a dog 42 on the former engaging a similar dog 44 on the latter, as shown in FIG. 2.

Figure 3:
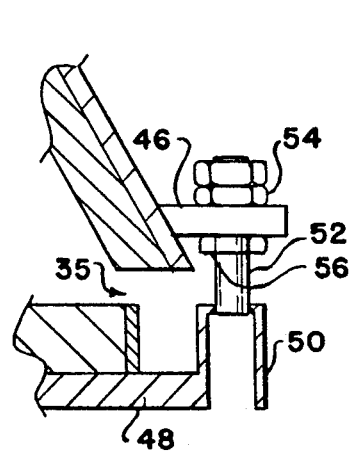
FIG. 3 is an enlarged view of a portion of FIG. 1 to show details of an arrangement for controlling or adjusting the peripheral outlet gap between the centrifuge container's sleeve and base portions.

The peripheral wall 30 has three lateral tabs 46 (at 120° spacings) to afford mechanical constraint relative to the base plate 34, as shown in greater detail in FIG. 3, and particularly to provide connections for adjusting the outlet gap 35 between them. These connections include corresponding extensions 48 on the base plate, a collar-like support 50 affixed to each such extension, a threaded stud 52 secured to each collar and passing upwardly through the associated tab 46, and an upper lock nut 54 to limit the outward movement of the wall 30 from the base plate 34. A lower lock nut 56 is also used when it is desired to set a fixed outlet gap; otherwise, the wall can simply be allowed to move away from the base plate as the unit is rotated until the tabs 46 engage the upper lock nuts 54. Openings at the base of collars 50 are useful for connecting hooks to lift the whole unit off the turntable after a spinning cycle.

The centrifuge container also has a refractory lined, removable top cover 60 (FIG. 1) to provide for introducing skim material after the sidewall sleeve 30 has been placed on the base plate 34. Lift rings 62 are provided for removing the cover, and similar rings or lugs 64 are provided for removing the centrifuge container (i.e. the base plate 34 and sleeve 30 as a unit) from the turntable 12.

Figure 5:
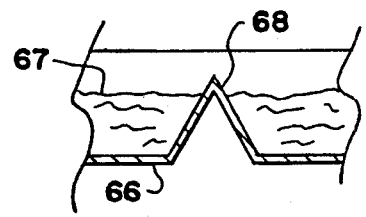
FIG. 5 is a partial transverse section through an interior baffle of the collector trough, taken along the plane V—V of FIG. 4.
Figure 4:
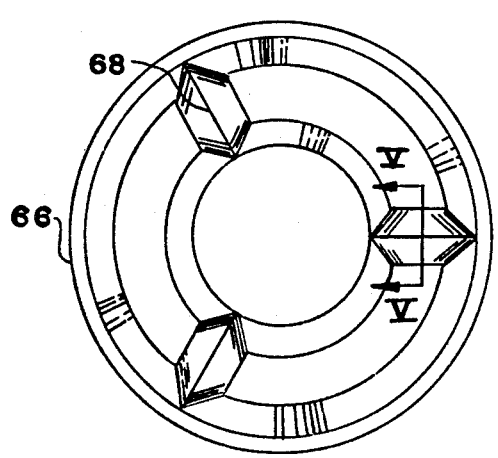
FIG. 4 is a plan view of the collector trough from the orientation of plane IV—IV of FIG. 1.

As the centrifuge is rotated with a charge of skim material in place, a non-aluminous portion of the skim is consolidated into a porous cake at the inside of the outlet gap 35. Molten aluminum separates from residual portions of the charge, some of it being filtered through the porous cake, and passes through the peripheral outlet gap 35 between sleeve 30 and the base plate 34. The molten aluminum is collected in a trough 66. The trough (which is formed to serve also as a deflector shield) is divided by interior partitions or baffles 68 (see FIGS. 4 and 5) to afford easier removal of the aluminum 67 when it has solidifed in the trough.

The residual skim material is usually allowed to cool below about 350° F. before it is removed from the centrifuge bowl. After removal, friable residue is crushed, preferably performed dry. In the illustrated embodiment, the crushing of residual skim material 100 is firstly accomplished in a hammer mill 102 which is schematically illustrated in FIG. 7 and secondly, in a ball or rod, mill 104 as is illustrated in FIG. 8. Preferably, the hammer mill reduces the residual skim material 100 until no piece is more than about 1 inch in any dimension. The residual skim material 100 is treated by a rotating drum 106 and mill balls 108 of the ball mill 104 until it appears to be segregated into rounded, generally larger, bits and angular-surfaces, generally smaller, bits. This separation typically takes between 4 and 16 hours of ball milling. The larger, rounded bits include a high percentage of metal whereas the angular-surfaced, generally smaller, bits include a higher percentage of non-aluminous materials.

The crushed residual skim material is then screened, or sifted in a screening assembly 110 including a rough sieve or screen 112, a medium screen 114, a fine screen 116, and a final surface 118. Using the Tyler Sieve Series, the rough screen 112 has a No. 4 mesh (0.185 inches or 4.699 mm openings), the medium screen 114 has a No. 28 mesh (0.0232 inch, 0.589 mm), and the fine screen 116 has a No. 100 mesh (0.0058 inch or 0.147 mm). Thus, once residual skim material has been sifted through the screening assembly 110 by shaking the screens 112 through 116 with an eccentric wheel 120, for example, the material which is on top of the rough screen 112 is identified as a $+4$ mesh fraction, the material on the medium screen 114 is identified as a $-4 +28$ mesh fraction, the material on the fine screen 116 is identified as a $-28 +100$ mesh fraction while the material on the final surface 118 is identified as a $-100$ mesh fraction.

The $-100$ mesh fraction gathered from the final surface 118 is a rather unusual foaming and extending agent for use in cement and other hardening type plastics, for example. The $-100$ mesh fraction contains inert ingredients (mainly the oxides of various metals), potential gas formers in the form of metallic (mainly aluminum and magnesium) nitrides and/or carbides (mainly aluminum and magnesium) as well as an aluminous metallic portion. The metallic portion of the $-100$ mesh fraction is not lower than 15% by weight and preferably in the range of 20–40% by weight. The presence of the nitrides and carbides has been determined qualitatively, however, they have not yet been measured. It is thought that they constitute between 0.1 and 10% of the $-100$ mesh fraction. The remaining portion of the fraction is made up of the inert ingredients. The foaming/extending agent (the $-100$ mesh fraction) is added to fluid cement 122, plastic or the like. The metallic portion of the foaming/extending agent will react with an acid or a base in, or added to, the fluid cement, or other plastic construction material, to produce a gas such as hydrogen. It is not thought necessary to describe this aspect of the process in greater detail inasmuch as aluminum powder has long been used in the past as a foaming or extending agent in this manner. However, in addition, the carbides and nitrides in the foaming/extending agent also combine in aqueous fluid cement mixtures, for example, to also yield useful gaseous products. For example, aluminum carbide or oxy-carbides may react with water or acidic solutions to produce methane.

These gases that are produced in the fluid cement 122, or other plastic, to create bubbles 124 (shown to be greatly magnified in FIG. 10) therein which cause the cement 123 or other plastic construction material, to "foam up". This unique plastic construction material then hardens in this foamed or extended state to provide a construction material of lesser density (weight per unit volume) than it would normally have had, had the construction material hardened without the foaming/extending agent being added thereto.

Finally, inert ingredients 126, such as metallic oxides, in the foaming/extending agent (the $-100$ mesh fraction), act simply as extenders or fillers.

It should be noted that the use of the $-100$ mesh fraction as a foaming/extending agent is possible because in removing the aluminum from the skim material salts and flux have not been added to contaminate the skim material.

The $+4$ mesh fraction that is removed from the rough screen 112 has a sufficiently-high aluminum content that it can be "puddle melted" directly into a heel (molten metal) in a furnace.

The −4 +28 mesh fraction taken from the medium screen 114 can be processed as was done with skim in the prior-art to get the aluminum from it. Although such processing produces the pollution and other problems set forth in the "Background of the Invention", above, it is noted that such problems are on a very small scale since only a small fraction of skim material is being processed and this fraction has a higher percentage of aluminum in it than raw skim processed in the prior art. Alternately, this −4 +28 mesh fraction may, preferably, be water washed to remove most of the carbides and nitrides, then dried, and fed directly to an aluminum reduction cell as a source of metal.

The −28 +100 mesh fraction taken from the fine screen 116 is put through the ball mill 104 once again and then rescreened with the screening assembly 110. This step can be consolidated with the processing of a subsequent charge of skim material.

Figure 6:
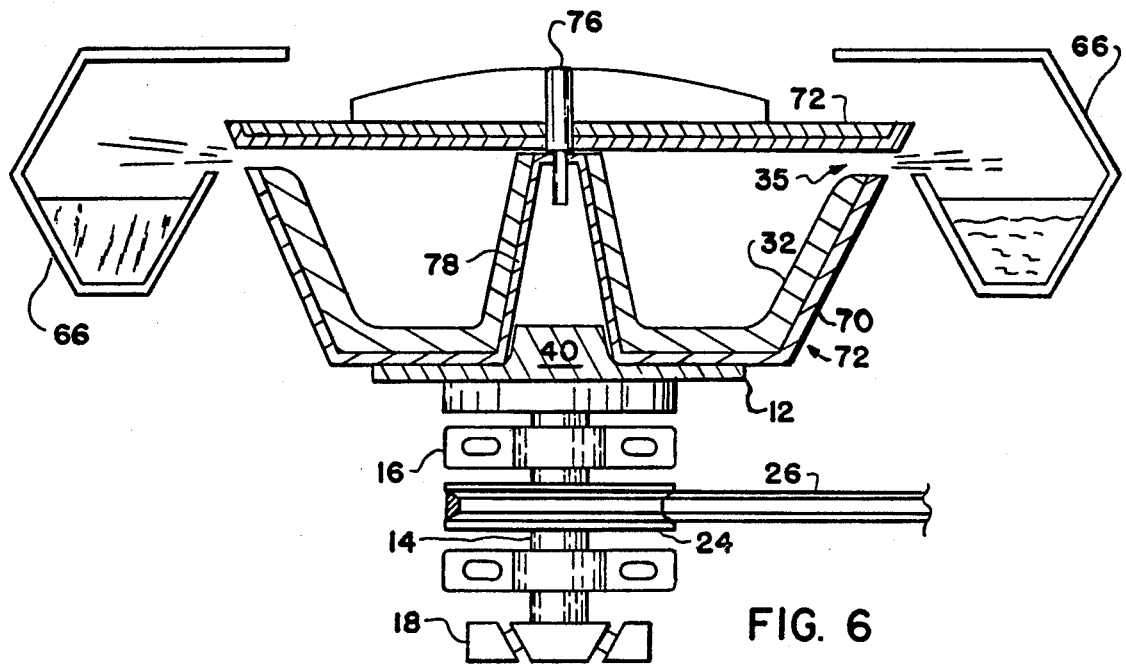
FIG. 6 shows an alternate embodiment of the centrifuge container, having an integral side wall and bottom.

An alternate embodiment of the centrifuge container is shown in FIG. 6. In this case the refractory lined sleeve 70 and its integral bottom together form a rotatable bowl 72; and the sleeve is tapered oppositely to that of FIG. 1 (i.e. upward and outwardly). A peripheral outlet gap is provided at the top of the bowl, adjacent a refractory lined upper closure element 74 which is mounted on a support stud 76 affixed to the upper flattened portion of a central conical enlargement 78.

EXAMPLES

The following illustrative examples of the practice of the invention are based on operation of a centrifuge unit as shown generally in FIGS. 1-5 of the drawings, for treatment of skim material from an oil-fired melting furnace. Furnace temperatures ran 1425°–1490° F. The skim was removed when the burners were off.

Skim was raked to the furnace door with a ram, then drained and brought to the top of a steel chute. A hoe was used to manually transfer skim down the chute into the centrifuge bowl. Small pockets of thermiting skim were observed during this transfer. The chute was removed, the load roughly distributed in the bowl, and the bowl cover lowered and locked in place. In each test run the bowl was gradually accelerated to about 200 rpm in about 30 seconds.

The following Table I summarizes the operation and results of three test runs.

TABLE I

| Base-wall Opening inch | Maximum Speed rpm | Duration of Spin minutes | Gross Metal Recovery lbs. | % | Remarks |
|---|---|---|---|---|---|
| 1/32 | 250 | 7 | 62 | 31 | Bowl Wall rested on the base, 3003 |
| 1/16 | 225 | 5 | 60 | 35 | Most of run at 175 to 200 rpm, 6063 |
| 1/8 | 200 | 7 | 136 | 46 | 6063 |

It may be noted that the separated aluminum was more readily discharged from the rotating centrifuge bowl when the outlet gap was increased. The metal product obtained at about ⅛ inch outlet gap contained no noticeable ashy residue.

Extracted metal striking the deflector shield outwardly of the bowl either flowed into the collector trough, or first solidified on the shield and subsequently cooled quickly enough to shrink and drop off into the collector trough.

Residual portions of the charge were collected and retained in the bowl. After cooling, the entire bowl (base, wall and cover) was removed from the centrifuge. The bowl wall and cover were lifted free from the base. The residue did not stick to either the bowl wall or the bowl base and was readily friable (easily broken with the hands). For the third run listed in Table I, the gross metal recovery of 46% is based on 156 lbs. of residue (about 30% aluminum content) and 136 lbs. of recovered product metal discharged (4.2 lbs. residue content, or about 97% aluminum). A grab sample of the original skim charge analyzed about 61.2% aluminum content. Thus, a free-metal recovery of 74% was obtained, based on 132 lbs. of aluminum recovered in the centrifuge discharge and 47 lbs. in the skim residue.

Additional test runs were made using an outlet gap of about 3/16 inch and a maximum speed of rotation of about 200 rpm. Similar results were obtained.

The foaming/extending agent (the −100 fraction taken from the final surface 118 of the screening assembly 110) has been employed in tests in the manner described above to construct foamed concrete. The foamed concrete weighed only about 60 lbs. per cubic foot which is clearly much less dense than normal concrete.

While the invention has been particularly shown and described with reference to a preferred embodiment, it will be understood by those skilled in the art that various changes in form and detail may be made therein without departing from the spirit and scope of the invention. For example, different mesh sizes of screens could be used for the screening assembly 110 of FIG. 9. Further, the fractions taken from screens 112, 114, and 116 could be processed and utilized in other manners than those described herein. Also, a jaw crusher, or other type of crusher, could be used instead of the hammer mill of FIG. 7.

The embodiments of the invention in which an exclusive property or privilege are claimed are defined as follows:

1. A method of treating hot skim material after its removal from a body of molten aluminum to separate and recover aluminum contained therein without adding a salt flux to the skim material, which comprises the steps of:
    rotating a charge of said skim material in a rotatable container having at least one peripheral gap therein, said gap having a width in the range of from ⅛ to 1 inch at a temperature of at least above the liquidus under conditions effective substantially to avoid thermiting, and at a speed of rotation sufficient to separate molten aluminum from residual portions of the charge;
    consolidating with centrifugal force residual portions of said charge into a porous filter cake as the charge is being rotated at said peripheral opening, said container having a wall against which centrigual force drives said residual portions for consolidating said residual portions at said at least one gap, into said porous filter cake at said gap without substantially passing therethrough;
    discharging separated aluminum radially outwardly around and through said porous filter cake and through said gap.

2. The method of claim 1 wherein said at least one peripheral gap has a width within the range of from 3/16 to ½ inch.

3. The method of claim 2 including stopping rotation of said rotatable container, cooling residual portions of the charge in said container to a temperature below 1000° F., and removing the caked, cooled material.

4. The method of claim 1 wherein said at least one peripheral gap has a width of around 3/16 inch and some of the aluminum discharged radially outwardly is first filtered through said porous filter cake.

5. A method of processing molten aluminum skim to obtain a foaming and extending agent therefrom comprising the steps of:
gathering skim from molten aluminum;
centrifuging said skim to separate an aluminum portion of said skim from a residual portion of said skim;
crushing said residual portion of said skim and sorting particles therefrom to be used as a foaming and extending agent in plastic construction materials, said sorted particles being smaller than around 0.0058 inch (0.147 mm).

6. A method as in claim 5 wherein said centrifuging step is carried out in a centrifuge bowl having a peripheral gap therein, with a width in the range of from ⅛ to 1 inch, said centrifuge bowl having a wall which consolidates a non-aluminous portion of said skim into a porous cake at said gap to filter some aluminum passing through said gap, said aluminum portion of said skim being driven through said porous cake and said gap.

7. Method as in claim 5 wherein the sorting of said particles is accomplished with a screening assembly having at least two screens in series each successive screen having a smaller mesh size than the previous screen, the residual portion remaining on the larger mesh screen being further processed to obtain an aluminum fraction therefrom and the residual material passing through the finer mesh screen being used as a foaming/extending agent.

8. A method as in claim 7 wherein there are at least three screens and wherein the largest-mesh screen has a hole size of approximately 0.185 inches (4.699 mm), the second-largest mesh screen has an opening size of approximately 0.0232 inch (0.589 mm), and the finest mesh screen has an opening size of approximately 0.0058 inch (0.147 mm), and wherein the residual material caught by said finest mesh screen is again crushed and screened.

9. A method of reclaiming aluminous metal, metallic oxides and metallic nitrides and carbides from molten aluminum skim material comprising the steps of:
gathering skim from molten aluminum;
centrifuging said skim to separate an aluminum portion of said skim from a residual portion of said skim, said centrifuging being accomplished in a centrifuge bowl having at least one peripheral gap with a width in the range of from ⅛ inch to 1 inch and a wall for consolidating said residual portion of said skim into a porous cake at said gap;
crushing said residual portion of said skim to form crushed particles;
sorting said crushed particles according to size into a small-particle fraction containing metallic nitrides and carbides and into at least one large-particle fraction;
further treating said large particle fraction to extract aluminous metal therefrom.

10. A method as in claim 9 wherein said small-particle fraction has a particle size of less than approximately 0.0058 inch (0.147 mm).

11. A method as in claim 10 wherein said large particle fraction is separated into at least two other subfractions, a first having a particle size less than approximately 0.0232 inch (0.589 mm) and a second having a particle size greater than approximately 0.0232 inch (0.589 mm), and wherein the further step is included of further crushing and sorting said first subfraction to obtain additional particles having a size less than approximately 0.0058 inch (0.147 mm) to add to said small-particle fraction containing metallic nitrides and carbides.

12. A method as in claim 9 wherein said gap is in the range of from 3/16 to ⅛ inch.

13. A method as in claim 9 wherein said gap is around 3/16 inch.

* * * * *